United States Patent Office 3,479,451
Patented Nov. 18, 1969

3,479,451

FACSIMILE NEWSPAPER TRANSMISSION SYSTEM

Jerome Regunberg, % Queen City News Co., 136 Parker Ave., Poughkeepsie, N.Y. 12601, and Wolfgang H. Liepmann, Wellesley Hills, Mass.; said Liepmann assignor to said Regunberg Filed Nov. 15, 1966, Ser. No. 594,427
Int. Cl. H04n 5/76
U.S. Cl. 178—6.6 25 Claims

ABSTRACT OF THE DISCLOSURE

An electronic reception set for receiving electrical signals identifying printed matter and for reproducing the original document is described, together with the operation of the reception set in an electronic news distributing system.

This invention relates to the mass distribution of printed publications by electronic means. More particularly, it provides apparatus whereby a subscriber, within minutes after activating his reception set, can receive a print-out of the information broadcast on any one of several channels.

It is an object of the invention to provide improved apparatus whereby each of an essentially unlimited number of subscribers can substantially instantaneously obtain a permanent copy of the information broadcast on any one of several channels. An example of the present invention is a home news and information system with which a subscriber at any time can turn on his reception set, select a channel, and within minutes receive from his reception set a copy of the latest edition of an entire newspaper transmitted on the selected channel.

A further object of the invention is to provide apparatus of the above character that can be marketed at such a low cost as to be within the means of a vast number of the population.

Another object is to provide apparatus of the above character that automatically records the use by each subscriber of the information system. Periodic bills to each subscriber can be prepared from this record of his use of the system.

Further, it is an object to provide apparatus of the above character that can notify each subscriber of the availability of unscheduled information such as an extra edition of a newspaper.

Another object of the invention is to provide operator control apparatus for a multiple-channel, print-out receiver.

It is another object of the invention to provide apparatus for printing information identified by electrical signals on both sides of a sheet. A further object is that the apparatus be capable of printing on both sides of the sheet without changing the orientation of the sheet. Also, apparatus for two-side printing in accordance with the invention should be relatively low in cost, should operate quickly, and should be relatively mechanically simple and hence reliable.

Other objects of the invention will in part be obvious and will in part appear hereinafter.

The invention accordingly comprises the features of construction, combinations of elements and arrangements of parts exemplified in the constructions hereinafter set forth, and the several steps and the relation of one or more of such steps with respect to each of the others effected with such apparatus, and the scope of the invention is indicated in the claims.

For a fuller understanding of the nature and objects of the invention, reference should be had to the following detailed description taken in connection with the accompanying drawings, in which.

In accordance with the invention, information of the type carried in periodicals and books is electronically broadcast to a multitude of subscribers, preferably by means of conventional video signals corresponding to the contents of printed pages. The broadcast of each document is preferably continuous, being repeated throughout scheduled broadcast times. Newspapers and other timely reports are updated at selected times.

It is contemplated that several such broadcast stations will be operating simultaneously, illustratively transmitting different newspapers; and perhaps one channel will broadcast one or more other periodicals, with different ones being broadcast at different scheduled times.

Each subscriber has a reception set with which he can select the publication he wishes to receive. Shortly after being turned on, the reception set produces a complete printing of the selected publication. The reception set then automatically turns off.

Further, each reception set may automatically produce billing signals according to the subscriber's use of the set. These signals are transmitted to a central billing station. Alternatively, they are accumulated on a meter or like recording device that is read periodically, much the same as a residential water or electric meter.

This information broadcasting system eliminates much of the cost now incurred in newspaper production and distribution. In fact, for a newspaper that distributes copies exclusively with the present apparatus and hence prints no copies, the invention provides low-cost substitutes for all the labor otherwise incurred in conventional type-setting, printing, sorting and mailing, and distributing and vending. The broadcasting system can readily handle all the printed material found in a newspaper, including text, photographs, charts, maps and advertisements.

The invention also comprehends apparatus with which a broadcast station that has unscheduled extra or special information to broadcast can so inform subscribers whose receiving sets are in a stand-by condition and are set to that station. Each such subcriber can then decide if he wants to receive the extra information. Alternatively, each subscriber can switch his receiving set to accept automatically all unscheduled information broadcast on the selected channel.

Figure 1:
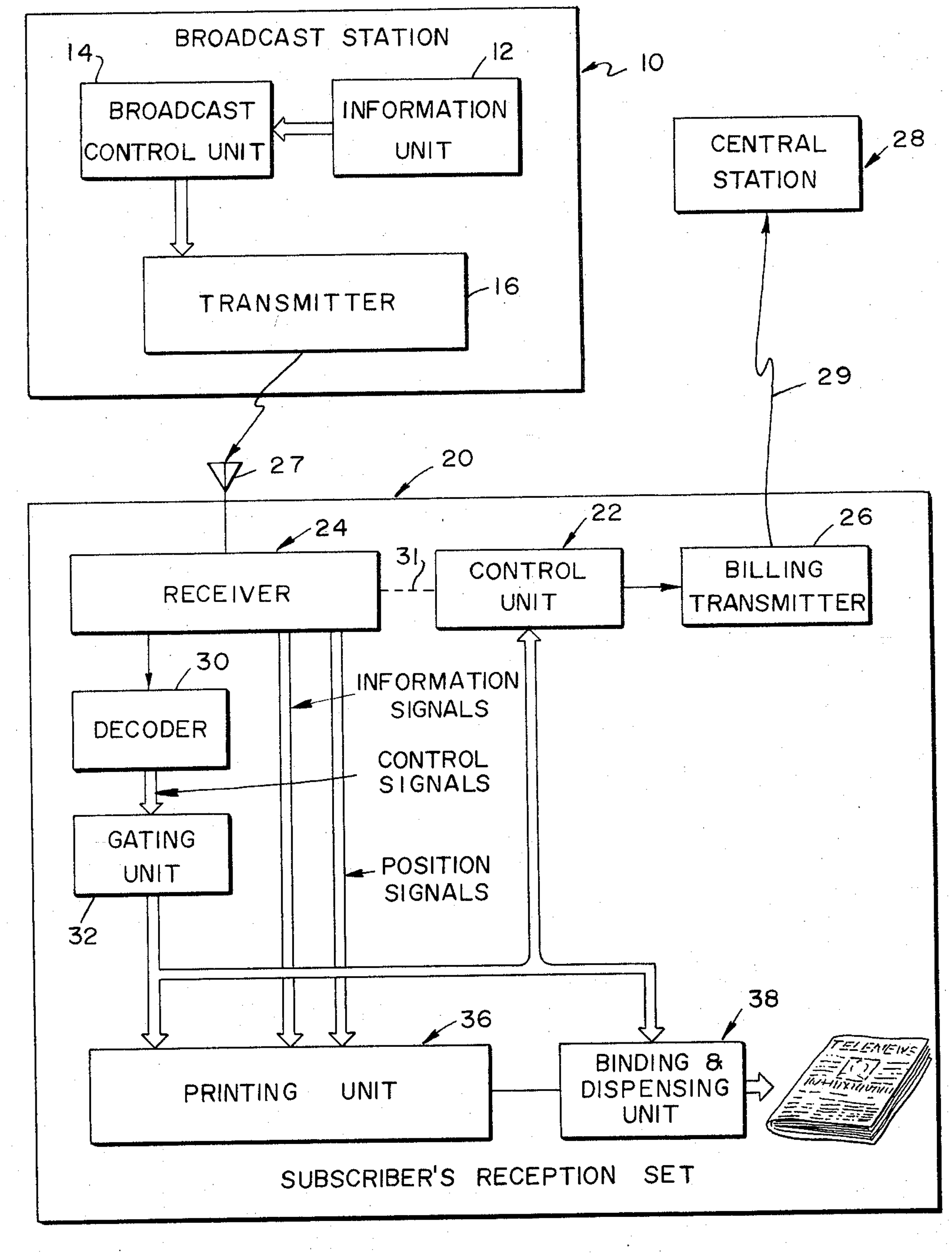
FIGURE 1 is a schematic diagram of an information broadcasting system embodying the invention.

More particularly, referring to FIGURE 1, a mass information broadcast system embodying the invention includes at least one broadcast station 10 that has an information unit 12, a broadcast control unit 14, and a transmitter 16.

During operation of the broadcast station 10, a document to be transmitted is exposed to an optical scanner in the information unit 12. The scanner can be a television camera, a flying spot scanner or other electrooptical reading device capable of converting an optical image into a video signal. Thus, as it scans the document, the information unit produces information signals corresponding to the printed material being scanned and position signals that correspond to the horizontal and vertical position of the scanner mechanism. These signals from the information unit 12 are applied, suitably by way of the control unit 14, to the broadcast station transmitter 16, which transmits them to subscribers' reception sets. The transmission can be wireless or via transmission lines. If a low enough information rate is satisfactory, telephone lines can be used.

In addition, the broadcast station control unit 14 produces control signals synchronized with the information and position signals and send them to the transmitter 16. These control signals, suitably coded binary pulses, can for example signal that transmission of a publication or other document is to begin. Also, a control signal can advise subscribers that the broadcast station is in the process of transmitting an already-started publication, and that therefore the subscriber will have to wait for the start of the next broadcast of that publication. The control signals also can convey such information as the page size on which the publication should be printed, when transmission of a document is complete, when the reception set should bind and dispense the pages it has already printed, and when extra or special information is available for transmission.

With further reference to FIGURE 1, the subscriber's reception set, indicated generally at 20, provides the subscriber with a printed copy of each publication he selects. The reception set 20 includes a control unit 22 with which the subscriber turns his set on and selects the channel broadcasting the publication he desires to receive.

Connected to the control unit 22 is a billing transmitter 26 arranged to send to a central station 28 billing information according to the subscriber's use of his reception set. Thus, each time the subscriber operates his set 20 to print out another copy of a publication, the illustrated billing transmitter 26 transmits to the central station 28 the identity of the subscriber and the channel he selected.

The billing transmitter 26 can conveniently be connected to the central station 28 by way of a telephone line 29. Data processing equipment at the central station 28 then automatically receives and processes each item of billing information sent to it from the many subscribers with which the station is connected.

As also shown in FIGURE 1, a receiver 24 in the reception set 20 receives the transmission of the selected broadcast station; where the broadcast is wireless the receiver is connected to an antenna 27. A tuning link 31 with the control unit 22 tunes the receiver to the channel the subscriber selects with the control unit.

In response to the transmission it receives, the receiver 24 reproduces the information signals, position signals, and coded control pulses from the transmitter of the selected broadcast station 10.

A decoder 30 in the reception set 20 receives the control pulses from the receiver 24. It in turn energizes different control circuits (e.g. gates and flip-flops) in a gating unit 32 according to the coding of the pulses. For example, in response to control pulses the broadcast station transmits when it has completed transmission of a publication, the decoder applies a CLEAR pulse to a gate in the gating unit to turn off reception set at the appropriate time.

Another signal from the decoder 30 is an EXTRA pulse produced when the receiver receives control pulses announcing that the selected broadcast station is about to transmit unscheduled information.

With further reference to FIGURE 1, the information and position signals from the reception set receiver 24 are applied to a printing unit 36 in the reception set. As detailed below, this unit advances paper stored therein to a printing mechanism and operates the printing mechanism to fix on the paper, preferably with xerographic or electrostatic copier techniques, a reproduction of the transmitted document. Finally, a binding and dispensing unit 38 binds the printed pages and dispenses them to the subscriber.

For one mode of operating the broadcasting station, FIGURE 1, the broadcast control unit 14 includes a video recorder and digital coding equipment. With this equipment, the broadcast station staff can prepare a proof of each page of the document that is to be transmitted and then record the page proofs on a video tape. That is, an operator first depresses a switch that causes the coding equipment to record on the video tape, typically in lieu of the audio signals conventionally recorded when a television program is filmed, a succession of binary-coded pulses to identify a START control signal. The proof of the first page of the document is then arranged before the video recorder camera (housed in the information unit 12), and in response to another signal from the operator, the camera scans the page proof, thereby recording the information and position signals identifiying respectively the information on the page proof and the position of the scanning beam of the camera. The camera and the recorder are arranged to turn off automatically after the camera scans the single page proof.

In this fashion, the operator causes the camera to record each page in succession. After the last page in each section of the document has been thus recorded, the operator causes the coding equipment to record a succession of binary pulses identifying an END OF SECTION control signal. The proofs of the pages of the next section are then recorded. After the last page of the document is recorded and the END OF SECTION control signal for the last section of pages is recorded, the operator causes the coding equipment to record pulses identifying a CLEAR control signal.

A video tape can readily be prepared in this manner using conventional techniques. For example, the broadcast station can employ equipment similar to that used in preparing tape recordings of conventional television programs. The information signal that is recorded would thus identify the light intensity of successive elements of the page proof. The position signals recorded on the video tape would be the well-known synchronizing signals that synchronize the sweeping operation of the horizontal and vertical deflection systems controlling the position of the electron beam of the camera. Further, the binary-coded control pulses can be produced with elementary digital techniques.

When the broadcast station has unscheduled information to disseminate, a similar video tape is prepared. However, the START control signal is preceded, perhaps by as much as several minutes, by an EXTRA control signal. Also, an EXTRA CLEAR control signal is used in place of the CLEAR signal normally recorded at the end of the tape.

The manner in which these control signals, i.e. START, END of SECTION, CLEAR, EXTRA, and EXTRA CLEAR, are processed at each subscriber's reception set is described hereinafter.

Figure 2:
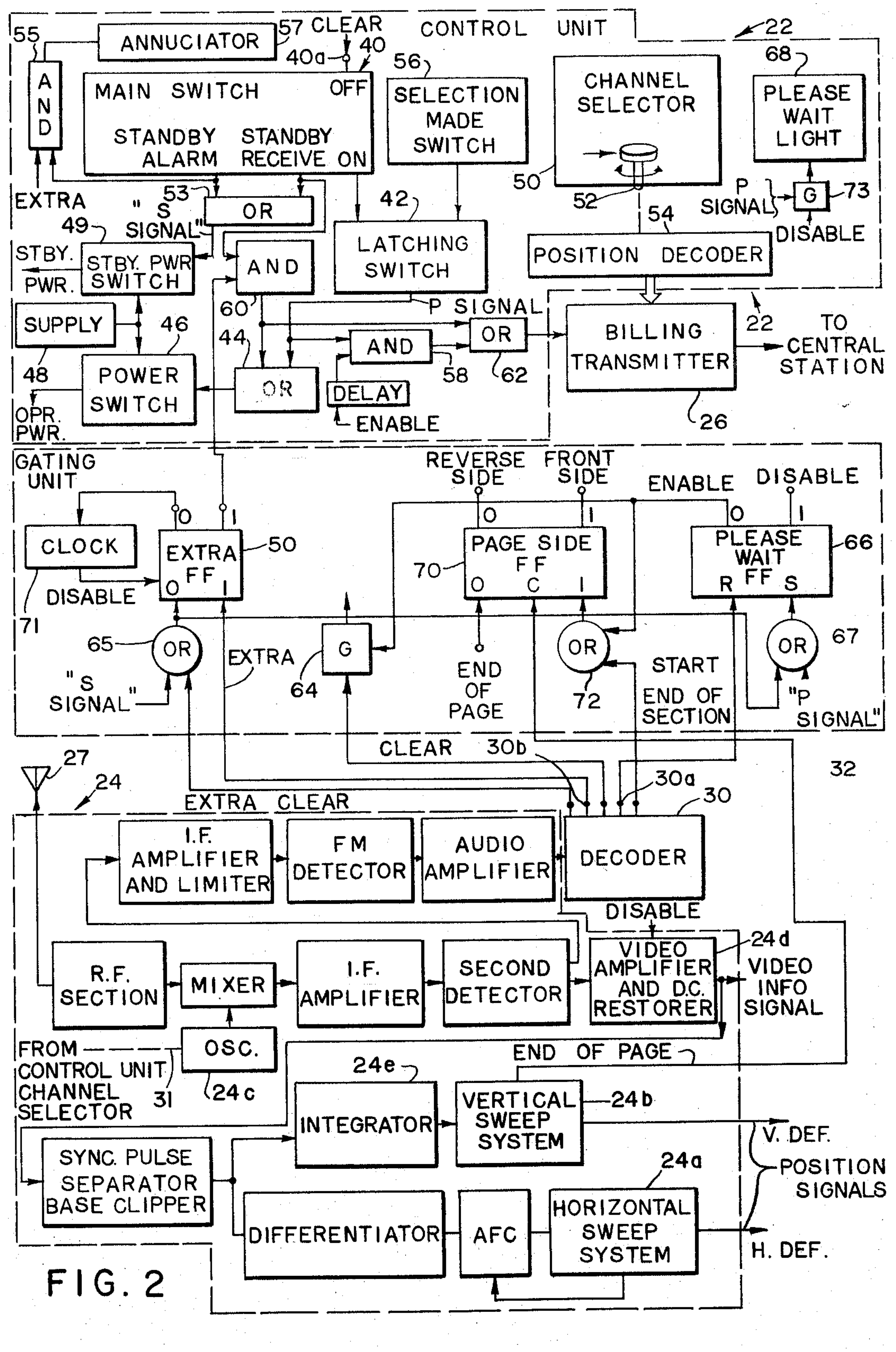
FIGURE 2 is a schematic diagram of a control unit, a gating unit, and a receiver for the system of FIGURE 1.

FIGURE 2 shows at the bottom a simplified block diagram suitable for the receiver 24 of the subscriber's reception set 20. It is substantially identical to a conventional television receiver with the information signals taking the form of the conventional video signals and the position signals being the conventional horizontal and vertical synch pulses that respectively synchronize the horizontal and vertical sweep systems. These synch pulses conventionally occur between bursts of the video information signal.

The information and the position signals from the receiver are applied to the printing unit 36, FIGURE 1, of the reception set. They are processed in the manner set forth below with reference to FIGURE 3.

As is conventional in television receivers, the vertical sweep system **24*b* in the receiver 24 produces the vertical deflection voltage with a periodic ramp wave form. The increasing voltage of each ramp moves the beam of a cathode ray tube in the printing unit 36 across the phosphorescent face of the tube when a full page is being prepared. This operation of the sweep system 24b is usually achieved by triggering a sweep oscillator therein when the amplitude of the voltage from the receiver integrator 24e attains a particular value. That is, when the integrated voltage attains the triggering value, the sweep system 24b produces a pulse that triggers the sweep oscillator to start another ramp. The pulse thus coincides with the time the printing unit 36 completes forming the image of the page being printed. This pulse is accordingly referred to here as an END of PAGE pulse and as described below is utilized in the gating unit 32** of the reception set.

With further reference to FIGURE 2, the reception set receiver 24 detects the control pulses that the broadcast station 10 (FIGURE 1) transmits, and applies them to the decoder 30 in the same manner that a conventional television receiver detects the audio signals and applies them to a loudspeaker. In response to a group of these binary pulses identifying a control signal, the decoder develops a pulse at a terminal associated exclusively with that control signal. For example, when the decoder 30 receives the sequence of pulses the broadcast station sends out to announce the start of the broadcast of a document, it produces the START signal by briefly energizing an output terminal 30a. In response to the other control signals set forth above, the decoder develops pulses at its other output terminals.

FIGURE 2 also shows, in the middle, further details of the reception set gating unit 32. The illustrated gating unit has a gate 64 and three flip-flops 50, 66 and 70 that only respond to pulses or a change in the level of a voltage. An extra flip-flop 50 stores the EXTRA pulse when in the ONE state. The EXTRA CLEAR signal is applied through an OR circuit 65 to switch the flip-flop 50 to the ZERO state.

A please wait flip-flop 66 develops a DISABLE signal when in the ONE state. It is switched to the ZERO state, where it produces an ENABLE signal, by the START signal from the decoder 30.

The CLEAR signal is applied to the gate 64, which is enabled to pass this signal only when it concurrently receives the ENABLE signal from the flip-flop 66.

A page side flip-flop 70 produces FRONT SIDE and REVERSE SIDE signals, respectively, when in the ONE and ZERO states. This flip-flop receives the END OF PAGE pulses at a complement input terminal and is switched to the ONE state by either the END OF SECTION pulse or the initiation of the ENABLE signal, both of which are applied to an OR circuit 72 connected to the flip-flop ONE input terminal. With this arrangement, the page side flip-flop is placed in the ONE state at the beginning of each publication being received and also at the beginning of each section of a publication. Thereafter, it is complemented at the end of each page so that its state changes for successive pages of the publication being printed. The manner in which the output signals from the flip-flop 70 are used to control the printing is described below with reference to FIGURE 3.

The control unit 22 with which the subscriber operates his reception set 20 is shown at the top of FIGURE 2. It has a main switch 40 that can be placed in an ON position, a STANDBY RECEIVE position, and a STANDBY ALARM position, in addition to being placed in an OFF position. The main switch 40 automatically assumes the OFF condition when it receives the CLEAR signal from the gate 64 at a clear terminal 40a.

When the main switch 40 is in the ON position, it enables a latching switch 42. When the latching switch is enabled, it closes when a selection made switch 56 is operated. The closed latching switch develops an output level, designated a P signal, that causes an OR circuit 44 to close a power switch 46. When closed, the power switch applies operating power from a supply 48 to those parts of the reception set 20 not already energized by operating the switches 40 and 56. The circuit for distributing the operating power is conventional and is not shown.

When in the STANDBY RECEIVE position, the main switch 40 operates an OR circuit 53 to produce an S signal that closes a standby power switch 49 to apply operating power from the supply 48 to the parts of the reception set 20 required for standby operation, i.e. required to produce the EXTRA control signal. The standby power switch 49 accordingly applies operating power to the portion of the receiver 24 required to process the control pulses and apply them to the decoder 30, to at least the portion of the decoder 30 required to energize the extra terminal 30b, and to the extra flip-flop 50 in the gating unit 32. The please wait flip-flop 50 is also energized.

The S signal, which like the P signal is a level, is applied to the gating unit OR circuit 65. As a result, the extra flip-flop is switched to ZERO whenever the main switch 40 is placed in a STANDBY position. Further, the output from the gate 65 and the P signal are applied to an OR circuit 67 whose output switches the please wait flip-flop 66 to the ONE state.

As also shown in FIGURE 2, the control unit 22 also has a channel selector 50 illustrated as a rotary multiple-position switch having a shaft 52. The tuning link 31 (bottom of FIGURE 2) couples the shaft to the oscillator 24c of the receiver 24 in a conventional manner to tune the receiver to the frequency of the channel selected with the selector 50.

The channel selector shaft 52 is also coupled to a position decoder 54 that produces electrical signals identifying the shaft position and hence the channel to which the selector is set. These signals are applied to the billing transmitter 26 of the reception set. When actuated with a keying signal, the billing transmitter sends the channel-identifying signals to the central station 28 (FIGURE 1).

A third control the subscriber operates in the control unit 22 is the selection made switch 56. This is appropriately a push button switch connected so that when depressed or otherwise closed it closes the latching switch 42 provided the latter switch is enabled by the main switch being in the on position.

When the latching switch is thus closed, it remains closed as long as the main switch stays in the on position. It opens as soon as the main switch is moved from the on position. If the main switch is not in the on position when the selection made switch is closed, the latching switch does not close. (By way of illustration, the latching switch can be constructed with an AND circuit that sets a flip-flop when it simultaneously receives the signals produced when the main switch 40 is on and the selection made switch 56 is closed. The output level from the flip-flop can be the latching switch output, i.e. the P signal, and hence applied to the OR circuit 44. The flip-flop can be cleared with the inverted main switch on signal, i.e. with a main switch NOT ON signal.)

Thus, to turn on his reception set, the subscriber sets the channel selector to the desired channel and places the main switch in the on position. Thereafter he momentarily closes the selection made switch to close the latching switch 42 and thereby apply operating power to the reception set. The selection made switch 56 is provided for the convenience of the subscriber, in that it enables him to select the publication he desires to receive after he has turned on the main switch. That is, without the selection made and latching switches, if the subscriber inadvertently turned the main switch on before setting the channel selector, the reception set would commence to receive a publication other than the one the subscriber wanted.

With further reference to the control unit 22, when in the STANDBY ALARM position, the main switch causes the OR circuit 53 to produce the S signal, which closes the standby power switch 49. In addition, an AND circuit 55, shown in the upper left corner of FIGURE 2, produces an output signal that operates an annunciator 57 in response to the coincident receipt of the STANDBY ALARM signal and the EXTRA level from flip-flop 50. The signal from the annunciator 57 thus notifies the subscriber that an unscheduled document is about to be broadcast. The subscriber can then receive the document by setting the main switch to the STANDBY RECEIVE position.

In addition to applying operating power to the rest of the reception set and to tuning the receiver 24, the control unit 22 has a logic circuit for keying the billing transmitter 26. The illustrated logic circuit consists of an AND circuit 58, an AND circuit 60 and an OR circuit 62, each of which has two input terminals. The input signals to the AND circuit 58 are the P signal from the latching switch 42 and the enable signal which the please wait flip-flop 66 produces when in the ONE state. A delay circuit 63 is interposed between the ZERO output from the flip-flop 66 and the AND circuit to avoid "contact race" problems.

In response to the coincidence of these signals, the AND circuit 58 activates the OR circuit 62 to produce a pulse that keys the billing transmitter 26, causing it to send billing information to the central station 28 of FIGURE 1. The billing transmitter is thus keyed when, after the main switch is placed in the ON position and the selection made switch operated, the reception set receives signals identifying the START signal.

The AND circuit 60 energizes the OR circuit 62 to key the billing transmitter 26 in response to the coincidence of the main switch 40 being in the STANDBY RECEIVE position and the extra flip-flop 50 being in the ONE state. These conditions for causing the AND circuit 60 to actuate the OR circuit 62 thus occur when the subscriber sets his reception set to receive unscheduled broadcasts and when the broadcast station transmits a sequence of pulses identifying the EXTRA signal, which announces that such information is to be broadcast.

With further reference to FIGURE 2, the output signal from the AND circuit 60 is also applied to the OR circuit 44, thereby closing the power switch 46. This applies operating power to all of the reception set, so that it can receive the unscheduled information about to be broadcast.

At this juncture the reception set is "on the air," ready to receive the selected broadcast and prepare printed pages corresponding to the document being transmitted. Before considering the operation of the printing unit of the reception set, the response of the control unit 22 to the CLEAR and EXTRA CLEAR signals will be described.

The CLEAR signal is produced in response to control pulses transmitted at the end of a scheduled broadcast, i.e. after the full set of information signals for all the pages of a scheduled document have been transmitted. The gate 64 middle of (FIGURE 2), when enabled, applies the CLEAR signal to the clear terminal 40*a* of the main switch 40. This places the switch in the OFF condition. As a result, the latching switch 42 opens, which opens the power switch 46 and turns OFF the reception set. However, the printing unit 36 and binding and dispensing unit 38 can be arranged to continue to receive power until they complete the preparation of the last pages.

Similarly, at the end of the broadcast of unscheduled information, the broadcast station transmits control pulses that cause the decoder 30 to produce the EXTRA CLEAR pulse that switches the extra flip-flop 50 to the ZERO state. This terminates the EXTRA signal applied to the AND circuit 60 and hence also opens the power switch 46, turning OFF the reception set. In the illustrated system, the EXTRA CLEAR signal does not turn the main switch 40 OFF. Rather, it is contemplated that the reception set should remain in the STANDBY RECEIVE condition to receive subsequent unscheduled broadcasts. Where the broadcast stations repeat unscheduled information several times in succession, the gating unit 32 is provided with a clock 71 (FIGURE 2) that is started when the flip-flop 50 switches to the ZERO state and thereafter prevents the flip-flop from assuming the ONE state for a specified time. Hence the reception set will respond to only one unscheduled broadcast within the operating time of the clock.

Continuing with reference to FIGURE 2, the DISABLE signal from the please wait flip-flop 66 is present whenever the main switch 40 is in a STANDBY position and no unscheduled broadcasts are being transmitted, i.e. the flip-flop 50 is in the ZERO state. In addition, the DISABLE signal is present in the interval between the time the subscriber turns his set ON and actuates it with the selection made switch (thereby producing the P signal), and the time when the decoder 30 produces the START pulse, which sgnals that broadcast of the selected publication is about to begin.

The DISABLE signal is applied to a gate 73 (FIGURE 2, upper right) in the control unit. Whenever the P signal and the DISABLE signal coincide, the gate 73 operates a please wait light 68 in the control unit to indicate to the subscriber that the set is ON and is awaiting receipt of the START signal.

The DISABLE signal is also applied to the receiver 24 to inhibit the production of information and position signals. This can be done, for example, by rendering the receiver video amplifier and D.C. restorer 24*d* (FIGURE 2) inoperative with the DISABLE signal. This prevents the reception set from responding to information and position signals transmitted during a broadcast that is in progress when the reception set was turned ON. Also, by enabling the gate 64 only when the ENABLE signal is present, the reception set does not respond to the CLEAR signal transmitted at the conclusion of such a broadcast. As a result, the reception set remains on at the conclusion of the broadcast in process when it was turned on and automatically commences printing when the broadcast starts anew.

Figure 3:
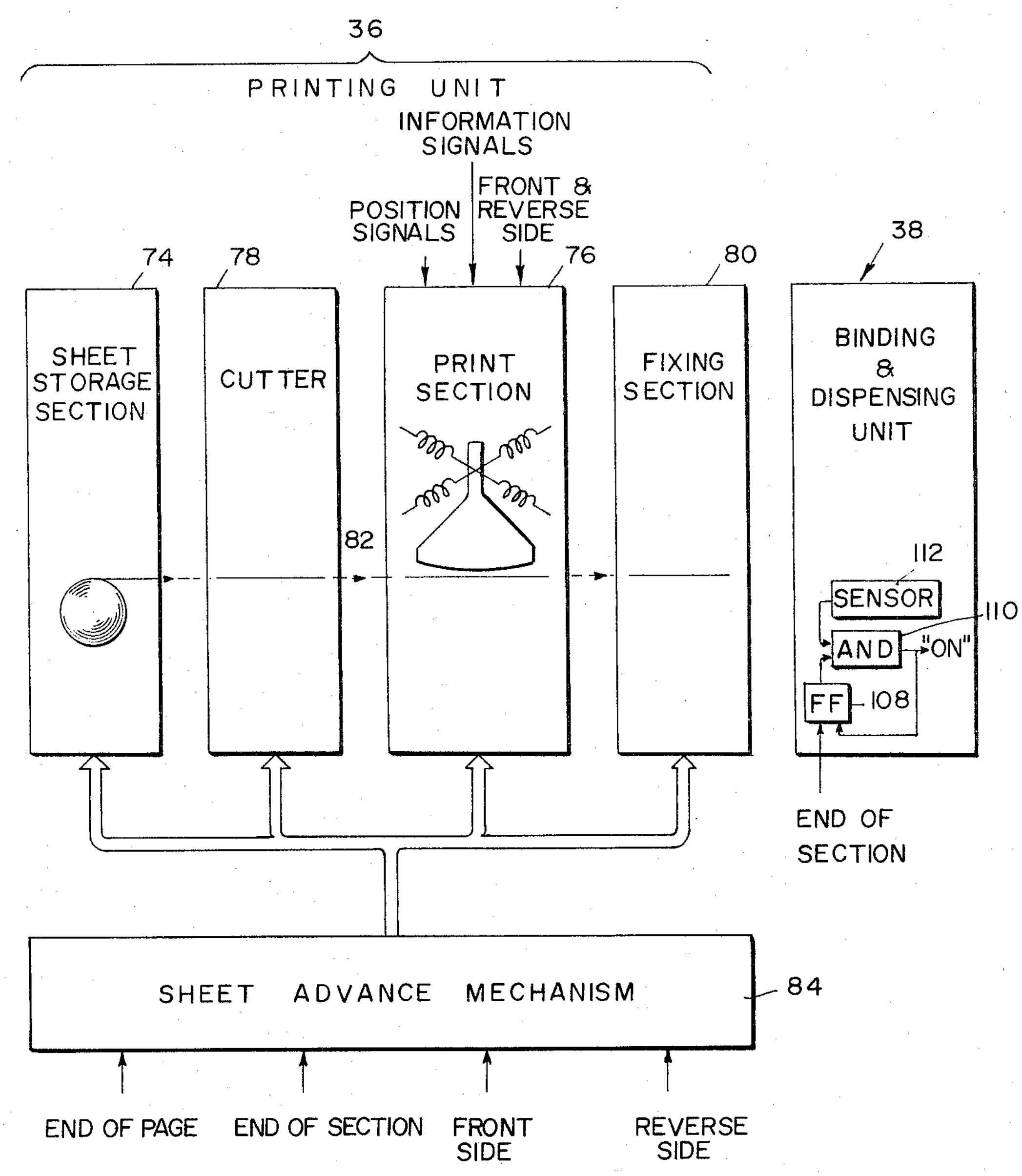
FIGURE 3 is a schematic diagram of a printing unit and a binding and dispensing unit for the reception set of FIGURE 1.

Turning to FIGURE 3, the illustrated printing unit 36 stores a dielectric sheet material, usually paper, in a storage section 74, and dispenses the material to a printing section 76 in two page lengths. The storage section can be constructed with techniques used in commercial wrapping and like machines. A cutter 78 between the storage and printing sections cuts the sheet material each time a two-page length, i.e. a double leaf, is fed to the printing section. The printing section, in conjunction with a fixing section 80, prints the pages of the document in response to the signals from the receiver 24 and the gating unit 32, both shown in FIGURES 1 and 2.

The illustrated printnig section 76 has a cathode ray tube 82 that projects an electron beam trace of the indicia on the original document exposed to the information unit in the broadcast station (FIGURE 1). The printing section converts this trace of the indicia to an image on the double leaf. This image is rendered permanently visible in the fixing section 80.

The equipment prints the two pages that are on the same side of a double leaf by forming the images thereof in the printing section, fixing both impages in the fixing section 80, returning the double leaf to the printing section, forming the images of the respective next pages on the other side of the double leaf, and then again advancing the leaf to the section 80 to fix the second images. Where the sheet material can carry images on both sides simultaneously without interference or perceptible degradation, the sequence can be modified so that all images are formed before the leaf is advanced to the fixing section. Movement of each leaf back and forth between the printing and fixing stations can thus be avoided. Further details of the printing and fixing sections are described with reference to FIGURE 4.

The printed leaves are then delivered to the binding and dispensing unit 38, also shown in FIGURE 3. There the double leaves for one section are folded in half and the section dispensed.

The printing unit 36 also includes a sheet advance mechanism 84 that feeds sheet material from the storage section 74 to the printing section, from the printing section to the fixing section, and on to the binding and dispensing unit 38 at appropriate times. In particular, the advance mechanism 84 engages the sheet material in the storage section 74 and advances a new double leaf to the printing section 78 each time the printing section impresses the last image on the reverse side of a double leaf. A new double leaf is also fed to the printing section 76 of each time an END OF SECTION signal is processed. Thus, the printing section 76 receives a fresh piece of sheet material preceding each printing of the first page on the front side of a double leaf. The advance mechanism 84 also operates the cutter 78 to cut the leaf of material in the printing section from the supply in the storage section after each such advance movement.

Further, the advance mechanism 84 moves the leaf between the printing section 76, the fixing section 80 and the binding and dispensing unit 38 in the sequence described above. Present-day process control knowledge can be used to provide this operation. The illustrated advance mechanism operates in response to the FRONT SIDE and REVERSE SIDE signals produced by the page side flip-flop 70 of FIGURE 2, and the END OF PAGE and END OF SECTION SIGNALS also produced in the gating unit 32.

With further reference to FIGURE 3, the binding and dispensing unit 38 thus receives completed double leaves in sequence from the fixing section 80. The illustrated unit 38 is actuated to operate only after it receives the END OF SECTION control signal, and it can then automatically processes the group of leaves that are to be bound together. Then it automatically turns off. Thus the unit 38 is actuated anew to bind and dispense each section of the document being prepared. This operation can be realized by providing the binding and dispensing unit with an AND circuit 110 that produces an ON output signal to actuate the rest of the unit 38. The ZERO output level from a flip-flop 108 in the unit 38 enables the AND circuit 110. The flip-flop is switched to this state by the END OF SECTION signal, which as described above is a pulse produced in the reception set decoder 30 in response to coded control pulses transmitted from the broadcast station after the transmission of all the pages of a document that are to be bound together.

The other input signal to the AND circuit 110 is developed in a sensor 112. The sensor employs conventional electrooptical or like techniques to produce an output pulse each time a leaf is delivered to the unit 38. The AND circuit 110 accordingly actuates the unit 38 when the completed last leaf of a section is delivered to the unit. The ON signal from the AND circuit 110 also switches the flip-flop 108 to the ONE state.

In response to the ON signal from the AND circuit 110, the binding and dispensing unit 38 folds, staples or otherwise binds together all the leaves therein and dispenses them to the subscriber. The unit can be constructed to carry out these operations according to conventional practices as employed in printing equipment. Suitable delays can be interposed in the operation of the printing unit 36 and in the binding and dispensing unit 38 depending on the relative speeds with which the various sections and parts thereof operate. However, any delays should be consistent with the scheduling of the signals the printing section 76 receives from the receiver 24 (FIGURE 1).

The following operating sequence summarizes the operation of the information broadcasting system as described above. Assume that a broadcast station 10 (FIGURE 1) is running a video tape (prepared as described above) through the broadcast control unit 14 and is part way through a publication broadcast when a subscriber turns on his reception set. The subscriber does this by setting the main switch 40 of the control unit 22 (FIGURE 2) to the ON position, setting the channel selector 50 to the appropriate channel, and then operating the selection made switch 56. As a result, the switch 42 produces the P signal, and the control unit 22 applies operating power to the rest of the reception set through the power switch 46.

The P signal also sets to ONE the please wait flip-flop 66 in gating unit 32 (FIGURE 2). In this state, the flip-flop 66 produces the DISABLE signal that prevents the receiver 24 from producing the information and position signals that would otherwise be applied to the printing unit 36. Also, the coincidence of the DISABLE signal, and the P signal activates the please wait light 68.

In this condition, the reception set does not respond to signals generated in response to transmission from the broadcast station 10. The only exception is that the reception set responds to the START, EXTRA, and EXTRA CLEAR control signals. The latter two are generally not transmitted during the transmission of a publication, being transmitted preferably only in the interval between complete transmissions of a publication.

Accordingly, when the broadcast station 10 has completed the current run-through of the video tape and starts to transmit the taped publication again, it first transmits the sequence of binary pulses identifying the START signal. In response, the reception set decoder 30 develops the START pulse, which switches the please wait flip-flop 66 to the ZERO state, thereby removing the DISABLE signal and producing the ENABLE signal. The removal of the DISABLE signal terminates the please wait light and releases the receiver 24 to develop position and information signals. The ENABLE signal, together with the persisting P signal, actuates the AND circuit 58 to operate the billing transmitter 26 and thereby send billing information to the central station 28 (FIGURE 1). Alternatively, where the subscriber has a billing meter instead of the billing transmitter, the AND circuit 58 causes the meter to start recording the operating time of the reception set. (Where publications on different channels or at different times have different rates, the broadcast station can transmit billing factor signals that the subscriber's reception set receiver applies to the billing meter to record the appropriate rate for each publication received.) The ENABLE signal also switches the page side flip-flop 70 to the ONE state. The resulting FRONT SIDE signal sets the reception set printing section 76 (FIGURE 3) to impress an image on the front side of a leaf.

With further reference to FIGURES 1, 2 and 3, the broadcast station next commences transmission of information and position signals for the first page of the publication. The receiver 24 accordingly produces the corresponding video information signals and horizontal and vertical deflection signals, and applies them to the printing unit 36. In response, the printing section 76 traces the image of the first page of the publication on the front of the leaf therein.

As the vertical deflection signal from the receiver attains the value where it deflects the beam of the cathode ray tube 82 to the bottom of the page or pages to be printed on the front side of the leaf, the receiver vertical sweep system **24*b* (FIGURE 2) produces the END OF PAGE signal. This signal complements the page side flip-flop 70, placing it in the zero state where it produces the REVERSE SIDE signal, which sets the printing section 76** to form an image on the reverse side of the leaf. (For greater reliability, it may be desirable to transmit a signal at the proper time from the broadcast station, FIGURE 1, to produce the END OF PAGE signal in the reception set.)

Also at this juncture, the sheet advance mechanism 84 (FIGURE 3) advances the leaf just exposed in the printing section to the fixing section 80. The fixing section automatically (in response, for example, to a signal from a sensor that detects the arrival of a leaf in the fixing section) renders permanently visible the image impressed on the leaf in the printing section.

The advance mechanism then returns the leaf from the fixing section 80 to the printing section 76. The printing section 76 and fixing section 80 then print another image on the reverse side of the leaf in response to further signals from the broadcast station. Thereafter, the completed leaf is delivered to the binding and dispensing unit 38, a fresh leaf is delivered to the printing section, the front side of this second leaf of the document is prepared. In this manner, successive leaves of the document are printed and deposited in order in the unit 38.

The image for each page may alternatively be formed with more than one sweep of the printing section cathode ray tube 82, i.e., the broadcast station may repeat the transmission for each page several times in succession. This will generally produce a more intense image of the page than a single exposure. The control signal logic described herein can readily be modified for this multiple exposure operation. For example, each leaf will then remain in the printing section until the several exposures for each page are completed; only then will the advance mechanism transport the leaf to the fixing section. High resolution and an intense image can also be realized with a high density of horizontal traces to print each line.

In response to a set of binary pulses identifying the END OF SECTION control signal, the decoder 30 sets the page side flip-flop 70 to the ONE state so that the next page, which is the first page of a new section, is printed on the front side of a leaf. The END OF SECTION signal also switches to ZERO the flip-flop 108 (FIGURE 3) to enable the binding and dispensing unit. When this unit receives one further leaf from the fixing section, i.e. the last leaf of a section of the document, the unit 38 binds together the leaves assembled therein and dispenses them to the subscriber.

At the end of the transmission of the publication, the broadcast station transmits binary pulses identifying the CLEAR control signal. The gate 64 (FIGURE 2) is already enabled by the ENABLE signal and hence passes this pulse to the terminal **40*a* on the main switch 40 of the reception set control unit, thereby switching the main switch to the OFF position. This turns off the reception set. Where the fixing section 80 and the binding and dispensing unit 38 have not completed processing of the last pages of the document when the decoder 30** produces the CLEAR signal, the reception set can readily be arranged to maintain the operating power ON until these units complete their operation.

The operation of the reception set 20 in receiving an unscheduled publication commences when the main switch 40 is placed in the STANDBY RECEIVE position, which causes the OR circuit 53 to produce the S signal. The onset of this level closes the standby power switch, and switches the extra flip-flop 50 to ZERO and the please wait flip-flop 66 to ONE. Subsequent receipt of the EXTRA control signal results in the flip-flop 50 being switched to ONE, which causes full operating power to be applied, and the billing transmitter to be activated. The reception set next receives the START signal, and its response to this and the ensuing transmission is the same as when the main switch is in the ON position.

The STANDBY RECEIVE operation terminates when the EXTRA CLEAR pulse is applied to the flip-flop 50; the CLEAR signal is not used.

Considering the mechanism of the printing section 76 and fixing section 80, FIGURE 3, in greater detail, the video information signals and the vertical and horizontal deflection signals from the receiver 24, FIGURE 2, cause the cathode ray tube 82 in the printing section to trace on its phosphorescent screen the indicia on the original document being transmitted. Exposure to this trace forms a corresponding latent charge image on the leaf of sheet material in the printing section.

This image is similar to that developed in many electrostatic copiers and persists while the leaf is transferred to the fixing section 80.

There the image is rendered permanently visible by subjecting the leaf to the same processing as is used in electrostatic copiers. That is, the leaf is exposed to a toner that adheres to the charged portions of the leaf. The toner is then fused to the leaf with heat. The leaf emerges from the fixing section 80 with a permanently visible pattern that corresponds precisely with the image impressed on it in the printing section.

With the sheet advance mechanism 84, FIGURE 3, described above, the leaf in the printing section 76 remains stationary and the cathode ray tube 82 is operated to sweep down a full page. The printing unit 36 can alternatively operate with the sheet material continuously advancing through the printing section 76 and the cathode ray tube 82 tracing successive lines across the tube face without vertical deflection; the images, formed on the leaf, of successive traces are then vertically displaced from each other due to the continuous advance of the leaf. Further, the cathode ray tube can be rotated so that each trace "slants" by an amount commensurate with the advance of the leaf in the interval of a single trace. The resultant image of each line will then be straight across the leaf. For this alternative operation, the broadcast station 10 (FIGURE 1) should send out a further control signal to demark the end of each page, for the receiver will no longer require a vertical deflection system.

Figure 4:
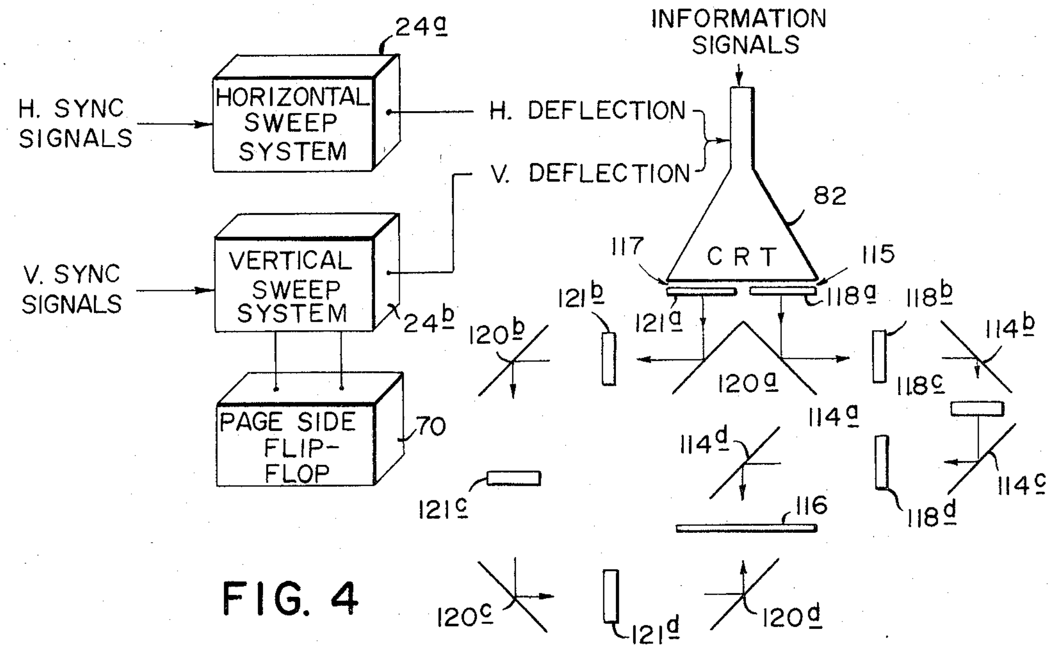
FIGURES 4 and 5 show apparatus for printing broadcast information on both sides of a sheet.

FIGURE 4 shows an arrangement of the reception set 20 for printing on both sides of a leaf with the single cathode ray tube 82. The horizontal sweep system **24*a* of the receiver 24 applies horizontal deflection voltages to the cathode ray tube 82 and the receiver vertical sweep system 24*b* applies vertical deflection voltages to the tube. The vertical sweep system produces its deflection voltage in the conventional ramp form. However, it is arranged so that the ramp voltage increases from a first value to a second value when the sweep system 24*b* receives the FRONT SIDE signal from the page side flip-flop 70, shown again for convenience in FIGURE 4. On the other hand, when the sweep system 24*b* receives the REVERSE SIDE signal from the flip-flop 70, it produces a ramp voltage that increases from a third value, at least as great as the second value, to a fourth value. The first and second values of the deflection voltage deflect the cathode ray tube beam through only the upper half of the tube, shown on the right, in FIGURE 4. Similarly when the vertical deflection voltage changes between the third and fourth values, it deflects the electron beam trace through the bottom half of the cathode ray tube 82, shown on the left in FIGURE 4. Thus, the phosphorescent trace is produced either at an image plane 115 or at an image plane 117, depending on the state of the page side flip-flop 70**.

With further reference to FIGURE 4, an alternate succession of optical deflectors **114*a*, 114*b*, 114*c*, 114*d* (e.g. mirrors) and optical focusing elements 118*a*, 118*b*, 118*c* and 118*d* (e.g. lenses) is aligned in the path of the trace between the image plane 115 and the front surface 116*a* of the leaf 116 in the printing section 76 (FIGURE 3). The deflectors and focusing elements are arranged to focus the trace on the surface 116*a***.

Another succession of optical deflectors **120*a*, 120*b*, 120*c* and 120*d* alternated with optical focusing elements 121*a*, 121*b*, 121*c* and 121*d* is aligned in the path of the trace from the image plane 117 to focus it on the bottom surface 116*b* of the leaf 116**.

With this arrangement, when the vertical sweep system **24*b* receives the FRONT SIDE signal from the flip-flop 70, the printing section 76 traces an image on the front surface of the leaf 16. Alternatively, when the vertical sweep system 24*b* receives the REVERSE SIDE signal from the flip-flop 70**, the image is traced on the reverse side of the leaf.

It should be noted that the orientation and position of the leaf 116 in the printing section 76 are the same for both of these image-impressing operations. This minimizes the complexity, cost, and size of the printing unit 36, and particularly of the advance mechanism 84 therein.

Figure 5:
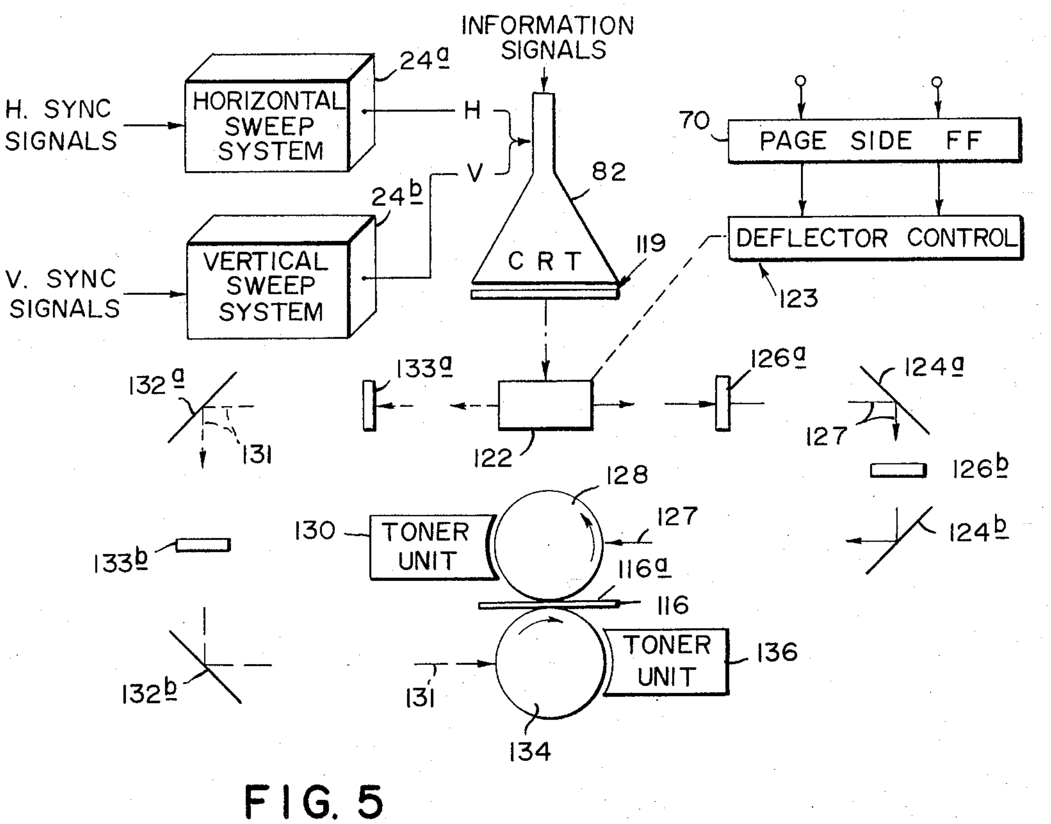

FIGURE 5 shows another arrangement that prints on both sides of each leaf without turning or otherwise changing the orientation of the leaf. The horizontal sweep system 24a and the vertical sweep system 24b of the receiver apply recurring ramp deflection voltages to the cathode ray tube 82 in a conventional manner, and the video information signals from the receiver 24 are also applied to the cathode ray tube. In response, the tube produces an optical trace on the phosphorescent screen. An optical focusing element 123 projects the trace to a variable optical deflector 122. A deflector control unit 123 causes the deflector 122 to project the trace on the tube screen to the right in FIGURE 5 when it receives the FRONT SIDE signal from the page side flip-flop 70. Fixed optical deflectors 124a and 124b and focusing elements 126a and 126b are aligned to form a path 127 for the trace between the deflector 122 and a xerographic copier drum 128. The drum 128 rotates in the counterclockwise direction as indicated so that after its cylindrical face is exposed to the trace from the cathode ray tube it passes a toner unit 130. There the pattern traced on the drum by the optical trace picks up toner material. The toner-carrying surface of the drum 128 then passes over the top side 116a of the leaf 116, depositing the toner image on the leaf. This operation of the drum 128 and toner unit 130 may be identical to that found in commercial xerographic copiers. After receiving toner from the drum, the leaf 116 is removed to the fixing section of the printing unit 36 (FIGURE 3) to fuse the toner. The leaf is then returned to the printing section 76 for printing on the reverse side.

This is done when the flip-flop 70 applies the REVERSE SIDE signal to the deflector control unit 123. In response, this unit causes the deflector 122 to project the optical trace from the cathode ray tube 82 to the left in FIGURE 5, along a path 131, to an aligned succession of fixed deflectors 132a and 132b and focusing elements 113a and 133b that direct the trace to another xerographic drum 134. This drum operates in the same manner as the drum 128 except that it rotates in the clockwise direction so that its cylindrical surface passes a toner unit 136 after being exposed to the trace and before engaging the reverse side 116b of the leaf 116.

With further reference to FIGURE 5, the variable deflector 122 can be a tiltable mirror, and the control unit 123 an electromechanical actuator that tilts the mirror to project the trace in the desired direction.

Alternatively, in either of FIGURES 4 or 5, the printing section 76 can be arranged to project the cathode ray tube beam directly on the sheet material or on the xerographic drums to produce the latent image of the indicia being printed. In this instance, the deflectors 114 and 120 in FIGURE 4, or the adjustable deflector 122 and fixed deflectors 124 and 132 in FIGURE 5 are electron beam deflectors employing constructions such as those used to deflect electron beams in cathode ray tubes and like devices. Further, the deflector control unit 123 then comprises a deflection voltage supply that applies one of two different voltages to the beam deflector 122 according to the state of the flip-flop 70. The focusing elements 118, 121, 126 and 133 of FIGURES 4 and 5 can likewise be constructed—to focus an electron beam—along the same lines as the focusing elements of cathode ray devices.

Figure 6:
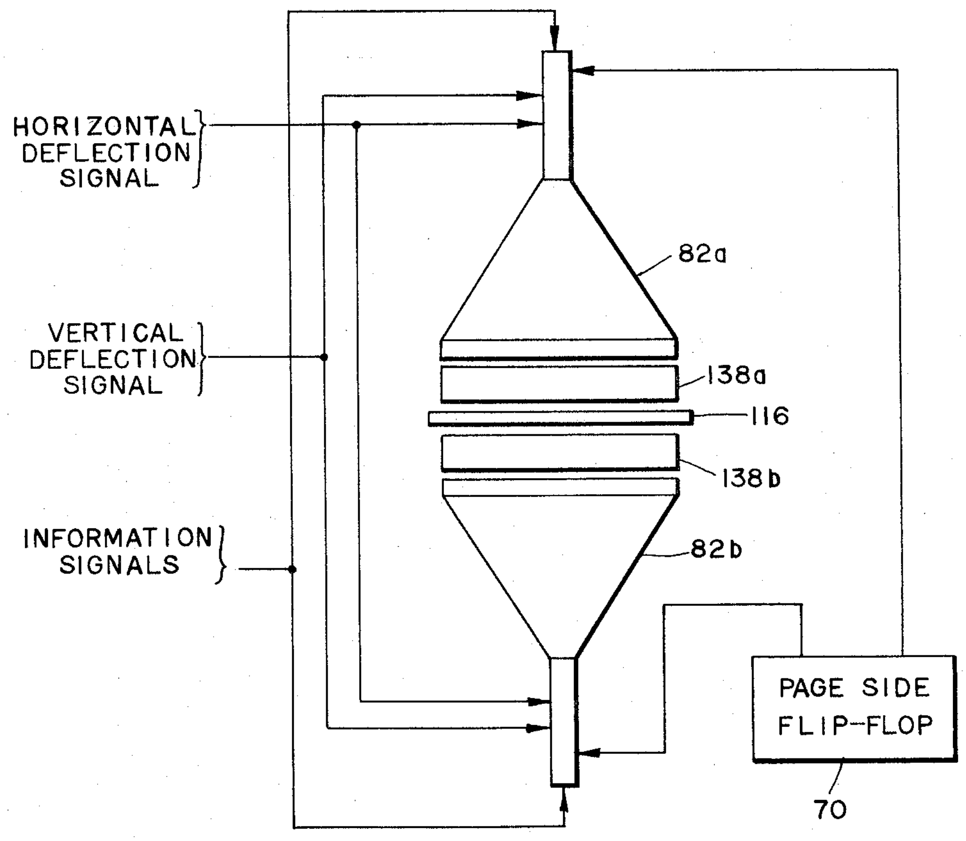
FIGURE 6 shows an alternative arrangement for printing on both sides of each leaf.

FIGURE 6 shows an alternative arrangement wherein the reception set printing section 76 has two cathode ray tubes 82a and 82b with each tube arranged to print on a different side of the leaf 116. The information signals from the receiver 24 (FIGURE 2) are applied to both tubes, but the page side flip-flops 70 causes the electron beam to be on only in the one tube that illuminates the page side that is to be printed.

The image formed at the phosphorescent screen of each tube is directed to the associated surface of the leaf 116 with an optical transmission unit 138a, 138b. It can employ optical lenses or optical fibers.

Where the sheet material can "carry" an electron image on both surfaces without interaction between them, the reception set can be operated to trace an image on each surface of the leaf 116 and then transport the sheet to the fixing section 80 (FIGURE 3) to fix the two images simultaneously. Otherwise, the sheet should be printed by successively forming an image on one side, fixing the image, forming the image on the second side and fixing that image.

Illustrative of the different arrangements suitable for the reception set 20, FIGURE 1, rather than operate with double leaves, it can be arranged to print single leaves that are stapled together in the dispense unit 38 of FIGURE 3.

It should also be noted that the control signals developed in the reception set receiver 24 (FIGURES 1 and 2) can be identified by different tones, rather than by different combinations of binary pulses. Each different tone is detected with a filter that produces an output signal in response to a tone of specified frequency. Such a filter decoder replaces the digital decoder 30 (FIGURE 2) in the reception set 24.

Further, with reference to FIGURE 3, the printing unit 36 can be constructed to form an image in the print section 76 on one leaf while fixing an image on a preceding leaf in the fixing section 80. Such an interleaving operation of the printing unit will shorten considerably the time required for the reception set to print a document.

A document broadcast system according to the invention thus provides a printed copy of any one of numerous publications directly to the consumer in his home, essentially instantaneously on request. The cost of the publication is very low because the publisher-broadcaster has practically none of the distribution expenses that conventional newspaper and like distributing arrangements require. On the other hnad, the publisher-broadcaster using the present invention can obtain substantially the same advertising revenue as present-day conventional newspaper publishers.

The illustrated reception set requires relatively few control circuits, and hence can be relatively inexpensive.

The two-side printing apparatus provided by the invention requires only a single cathode ray tube or like device. Further, it operates with a simple sheet advancing mechanism because the sheet is in the same position and orientation for printing on either side.

It will thus be seen that the objects set forth above, among those made apparent from the preceding description, are efficiently attained and, since certain changes may be made in carrying out the above methods and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what we claim as new and desire to secure by Letters Patent is:

1. Apparatus for receiving electric signals and producing in response thereto perceptible indicia on a sheet, said apparatus comprising (A) receiving means (1) arranged to accept information signals and to produce in response to them first signals corresponding to successive elements of printed matter and (2) arranged to accept further signals and produce control signals in response to them, (B) sheet supply and transport means arranged to store sheet material and to transport said sheet material along a processing path in response to selected control signals from said receiving means, (C) printing means (1) arranged to receive said first signals and control signals, (2) located at a first station along said processing path, and (3) operable in response to selected control signals to print indicia successively on each side of said sheet material in accordance with said first signals, and (D) assembling means (1) arranged at a second station along said processing path, and (2) operable to assembly in an ordered sequence sheet material received from said print means.

2. Apparatus according to claim 1 in which (A) said printing means comprises (1) image forming means responding to said control and first signals to form an image of said elements of printed matter on said sheet material, and (2) image fixing means for rendering said image substantially permanently perceptible, and (B) said transport means is arranged to transport sheet material successively to said image forming means and then to said image fixing means.

3. Apparatus according to claim 2

(A) wherein said image forming means is arranged to form each said image on a side of the sheet material identified with, and in response to, selected control signals, and (B) wherein said transport means is arranged to transport the same leaf of sheet material successively to said image forming means, to said image fixing means, to said forming means and to said fixing means, whereby said printing means can print indicia on both sides of the leaf of sheet material.

4. Apparatus for receiving electric signals and producing in response thereto perceptible indicia on a sheet, said apparatus comprising (A) receiving means (1) arranged to accept information signals and to produce in response to them first signals corresponding to successive elements of printed matter, and (2) arranged to accept further signals and produce control signals in response to them, (B) sheet supply and transport means arranged to store sheet material and to transport it along a processing path in response to selected control signals from said receiving means, (C) printing means (1) arranged to receive said first signals and control signals, (2) arranged at a first station along said processing path, and (3) operable in response to selected control signals to print indicia on said sheet material in accordance with said first signals, and (D) control means (1) in circuit with said receiving means, said transport means and said printing means, (2) operable to energize said receiving means, (3) responding to a first control signal to cause said transport means and said printing means to respond to said information and control signals, (4) responding to a second control signal to de-energize said receiving means, and (5) further arranged to inhibit operation of said transport means and said printing means in response to being operated to energize said receiving means and the coincident absence of a first control signal.

5. Apparatus for printing on a leaf of sheet material indicia identified with electrical signals, said apparatus comprising (A) printing means responding to said electrical signals to impress an image of said indicia on said leaf, (1) said printing means impressing said image on different sides of said leaf in response to a characteristic of a page side signal, (B) deflection means producing a first voltage that causes said printing means to impress said image on successively disposed portions of said leaf, (C) page side control means operable in one of two conditions to produce said page side signal with said characteristic having one of two values, and (D) threshold means arranged to change the operating condition of said page side control means in response to the value of said first voltage corresponding to the impression of said image on the bottommost portion of each leaf.

6. Apparatus according to claim 5 further characterized by said printing means being arranged to impress indicia on both sides of a leaf with the leaf in substantially the same position and orientation relative to said print means.

7. Apparatus for receiving electrical signals and producing in response thereto visually perceptible indicia on a sheet, said apparatus comprising (A) receiving means (1) operative alternatively in either an on condition or a standby alarm condition or a standby receive condition, (2) arranged when in said on condition to (a) accept information signals and to produce in response to them indicia-identifying signals, and (b) accept second signals and produce control signals in response to them, (3) arranged to produce a perceptible output signal in response to a selected second signal when in said standby alarm condition, (4) arranged to produce a selected first control signal in response to a selected second signal when in said standby receive condition, (B) printing means arranged to (1) receive control signals and said indicia-identifying signals, and (2) imprint indicia identified by said identifying signals on sheet material in response to said control signals, and (C) control means operative alternatively to (1) simultaneously place said receiving means in said on condition and to energize said printing means in response to a second signal indicating the start of transmission of information signals, or (2) simultaneously place said receiving means in said standby alarm condition and inhibit said imprinting operation of said printing means, or (3) respond to said first control signal by placing said receiving means in said on condition and energize said printing means in response to a second signal indicating the beginning of information signals.

8. Apparatus for receiving electrical signals and producing in response thereto visually perceptible indicia on a sheet, said apparatus comprising (A) receiving means (1) operative alternatively in an on condition and a standby condition, (2) arranged when in said on condition to (a) accept information signals and to produce in response to them indicia-identifying signals, and (b) accept second signals and produce control signals in response to them, (3) arranged to produce a selected first control signal in response to selected second signals when in said standby condition, (B) printing means arranged to (1) receive said indicia-identifying signals and said control signals, and (2) imprint indicia identified by said identifying signals on said sheet material in response to said control signals, and (C) control means (1) operative simultaneously to place said receiving means in said on condition and to energize said printing means, (2) alternatively operative simultaneously to place said receiving means in said standby condition and inhibit said imprinting operation of said printing means, and (3) arranged to switch said receiving means from said standby condition to said on condition in response to said selected first control signal.

9. Apparatus for printing indicia identified by electrical signals on either side of a sheet, said apparatus comprising (A) means for producing indicia-identifying signals and control signals, (B) means for producing page side signals identifying the side of said sheet on which said indicia is to be printed, (C) sheet transport means arranged to transport sheet material along a processing path in response to said control signals, (D) printing means arranged along said processing path and including (1) an electrical beam-projecting device arranged to project a trace of indicia identified by said identifying signals, (2) first and second means for imprinting the indicia traced by said beam-projecting device on first and second sides, respectively, of said sheet material, and (3) means responsive to said page side signal for directing trace projected in said imprinting means onto one of said imprinting means.

10. Apparatus according to claim 9 wherein (A) said beam-projecting device projects said trace at a first image plane, and (B) said trace-directing means comprises deflecting and focusing means for directing said trace from said first image plane onto one of said imprinting means.

11. Apparatus according to claim 9 wherein (A) said trace-directing means causes said beam-projecting device to project said trace at one of first and second image planes according to the value of said page side signal, and (B) each imprinting means is arranged to imprint the indicia traced in one of said image planes by said beam-projecting device.

12. Apparatus for printing indicia on either side of sheet material without changing the orientation of the sheet material, said apparatus comprising (A) electronic tracing means for tracing at a first image plane a focused beam of electrical energy according to indicia identified by signals applied thereto, (B) first trace-transferring means for impressing said indicia on a first side of said sheet material in response to illumination with said trace, (C) second trace-transferring means for impressing said indicia on a second side of said sheet material in response to illumination with said trace, and (D) beam-deflecting means selectively operable to deflect said beam from said first image plane to any one of said first and second trace-transferring means.

13. Apparatus according to claim 12 in which (A) said tracing means is arranged to produce an electron beam, and (B) said deflecting means is arranged to deflect the electron beam from said tracing means.

14. Apparatus according to claim 12 in which (A) said tracing means is arranged to produce an optical trace at said first image plane, and (B) said deflecting means is arranged to deflect optical energy.

15. Apparatus for printing indicia on either side of sheet material without changing the orientation of the sheet material, said apparatus comprising (A) electronic tracing means for tracing a focused beam of electrical energy according to indicia identified by signals supplied thereto, (1) said tracing means being selectively operable to trace said beam focused at one of first and second image planes so displaced from each other that illumination of either image plane with said beam produces substantially no illumination upon the other said plane, (B) first trace-transferring means for impressing said indicia on a first side of said sheet material in response to illumination with said trace, (C) second trace-transferring means for impressing said indicia on a second side of said sheet material in response to illumination with said trace, (D) first beam-deflecting means arranged in alignment between said first image plane and said first trace-transferring means and deflecting said beam from said first image plane to said first trace-transferring means, and (E) second beam-deflecting means aligned between said second image plane and said second trace-transferring means and deflecting said beam from said second image plane to said second trace-transferring means.

16. Apparatus according to claim 15 in which (A) said tracing means is arranged to produce an electron beam, and (B) each of said deflecting means is arranged to deflect the electron beam from said tracing means.

17. Apparatus according to claim 15 in which (A) said tracing means is arranged to produce an optical trace at said first and second image planes, and (B) each of said deflecting means is arranged to deflect optical energy.

18. Information-distributing apparatus comprising (A) broadcast apparatus arranged to (1) transmit carrier frequency energy modulated with first signals identifying the printed matter on successive pages of a document, (2) continually repeat for a selected period said transmission of the complete group of first signals associated with one document, and (3) transmit said energy further modulated with second signals identifying the initiation of, and the termination of, the transmission of each complete group of first signals, and (B) a plurality of reception units, each of which (1) is independently operable, (2) is arranged to receive said modulated energy and produce said first and second signals in response thereto, (3) is arranged to impress on sheet material the printed matter identified by said first signals, (4) initiates said impressing operation after being rendered operable only after receiving second signals identifying initiation of transmission of a complete group of first signals, and (5) automatically terminates operation when after initiating said impressing operation it receives second signals identifying the termination of a complete group of first signals.

19. Apparatus according to claim 18 in which (A) each reception unit comprises (1) image forming means responding to said first signals to form a latent image of said printed matter on the sheet material,
(2) image fixing means for rendering said image permanently perceptible on said sheet material, and
(3) transport means arranged to move sheet material between said image forming means and said image fixing means.

20. Apparatus according to claim 19 in which
(A) said image forming means is arranged to form said image on either side of the sheet material according to information conveyed to it by further second signals,
(B) said transport means is operable successively to advance a leaf of sheet material to said image forming means, transport the same leaf to said fixing means, return the leaf to the image forming means and then transport the leaf back to said image fixing means, so that said reception unit can impress printed matter on both sides of the leaf.

21. Apparatus according to claim 19 in which
(A) said image forming means comprises only a single image projecting device selectively operable to project said image to either side of the leaf, and
(B) said transport means is arranged to dispose every leaf of sheet material in said print means with the same orientation and position.

22. Apparatus for receiving electric signals and producing in response thereto perceptible indicia on a sheet, said apparatus comprising
(A) receiving means
(1) arranged to accept information signals and to produce in response to them first signals corresponding to successive elements or printed matter, and
(2) arranged to accept further signals and produce control signals in response to them,
(B) sheet supply and transport means arranged to store sheet material and to transport said sheet material along a processing path when said receiving means produces selected control signals,
(C) printing means
(1) arranged to receive said first signals and control signals,
(2) arranged at a first station along said processing path, and
(3) operable in response to selected control signals to print indicia on said sheet material in accordance with said first signals, and
(D) operator control means,
(1) operable in a first condition to energize said transport means and said printing means
(2) alternatively operable in a standby condition to
(a) maintain said transport means and printing means de-energized, and
(b) produce a selected first control signal in response to corresponding further signals, and
(3) responsive to said first control signal to switch from said standby condition to said first condition,
(4) responsive to a second control signal to de-energize said transport and printing means, and
(5) arranged to produce billing signals, only when in said first condition, corresponding to
(a) the number of times said control means is operated to energize said receiving means, or
(b) the duration for which said printing means is energized to print indicia on sheet material.

23. An information-distributing system comprising
(A) broadcast apparatus arranged to
(1) transmit carrier frequency energy modulated with information signals identifying the printed matter on successive pages of a document, and
(2) transmit said energy further modulated with control signals including START signals identifying the initiation of transmission of said information signals and CLEAR signals identifying the termination of transmission of said information signals, and
(B) a plurality of reception units, each of which
(1) is independently operable,
(2) is arranged to receive said modulated energy and demodulate said information and control signals therefrom,
(3) is arranged to imprint on sheet material the printed matter identified by said information signals,
(4) initiates said imprinting operation after being rendered operable, upon and only after receiving a START signal, and
(5) automatically terminates operation when, after said imprinting operation, it receives a CLEAR signal.

24. The system defined in claim 23
(A) in which said broadcast apparatus is arranged to transmit an end-of-page signal when the information signals corresponding to one of said pages have been transmitted,
(B) in which each of said reception units is arranged to respond to each of said end-of-page signals by imprinting the next page on the opposite side of said sheet material from the side on which the page preceding the end-of-page signal was imprinted.

25. The system defined in claim 23 in which
(A) said broadcast apparatus is arranged to transmit an EXTRA control signal preceding unscheduled transmissions of information, and
(B) each of said reception units includes means for
(1) inhibiting said imprinting operation and
(2) initiating said imprinting operation upon reception of an EXTRA signal.

References Cited

UNITED STATES PATENTS

| | | | |
|---|---|---|---|
| 2,213,876 | 9/1940 | Young | 178—6.6 |
| 2,656,412 | 10/1953 | Hammond | 178—6.7 |
| 3,084,213 | 4/1963 | Lemelson | 178—6.7 |
| 3,335,421 | 8/1967 | Sargent | 178—5.1 |

ROBERT L. GRIFFIN, Primary Examiner
HOWARD W. BRITTON, Assistant Examiner

U.S. Cl. X.R.

178—5.6, 6.8; 355—20